July 1, 1941.  E. DU PONT  2,247,911

HIGH PRESSURE WATER CLOSET

Filed Aug. 3, 1940  7 Sheets-Sheet 1

INVENTOR
Edmund Du Pont
BY
J. William Carson
ATTORNEY

July 1, 1941.  E. DU PONT  2,247,911
HIGH PRESSURE WATER CLOSET
Filed Aug. 3, 1940    7 Sheets-Sheet 2
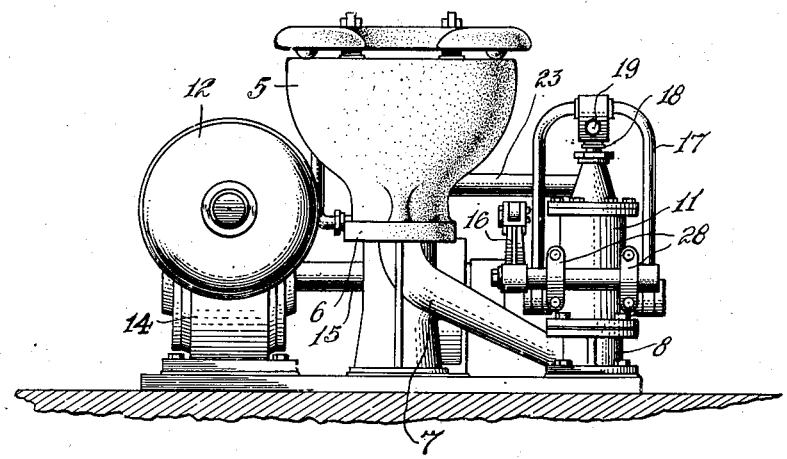
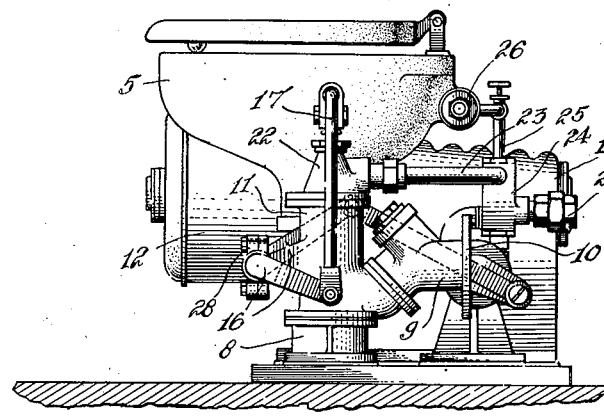
INVENTOR
Edmund Du Pont
BY
J. William Carson
ATTORNEY July 1, 1941.                E. DU PONT                2,247,911
                      HIGH PRESSURE WATER CLOSET
                        Filed Aug. 3, 1940              7 Sheets-Sheet 3
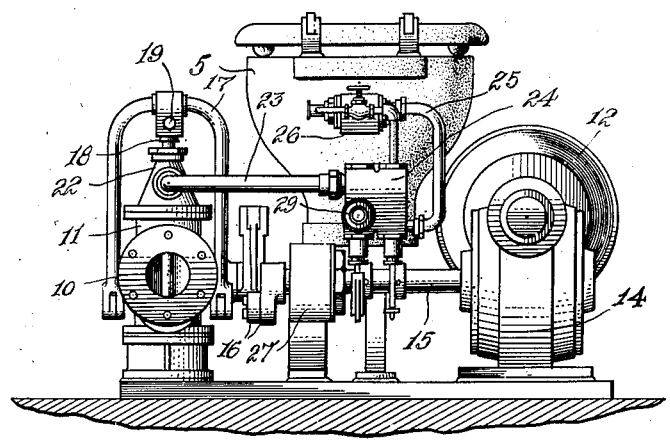
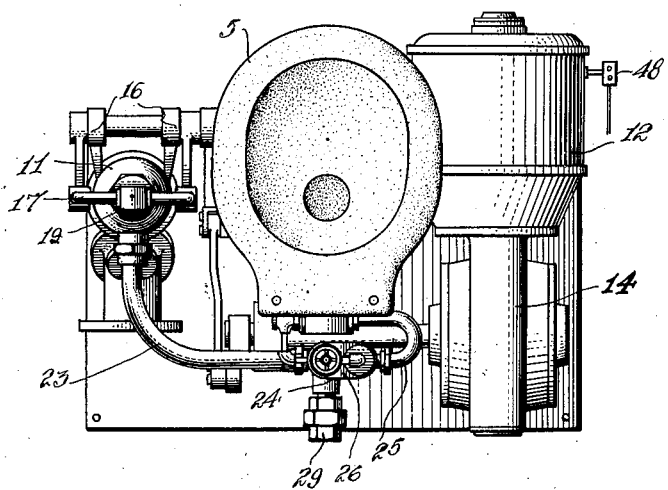
INVENTOR
Edmund Du Pont
BY
J. William Carson
ATTORNEY

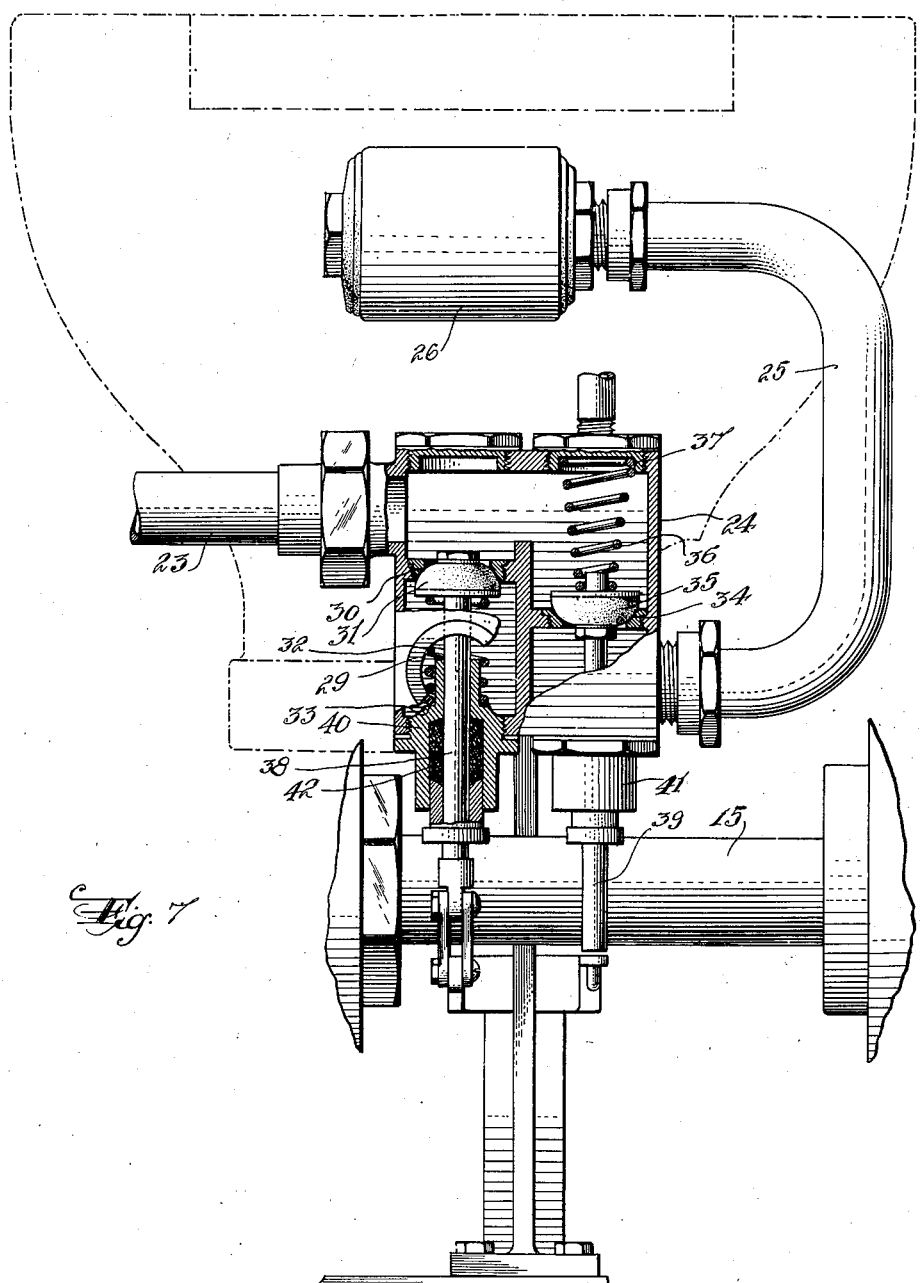

July 1, 1941.  E. DU PONT  2,247,911
HIGH PRESSURE WATER CLOSET
Filed Aug. 3, 1940  7 Sheets-Sheet 5

INVENTOR
Edmund Du Pont
BY
J. William Carson
ATTORNEY

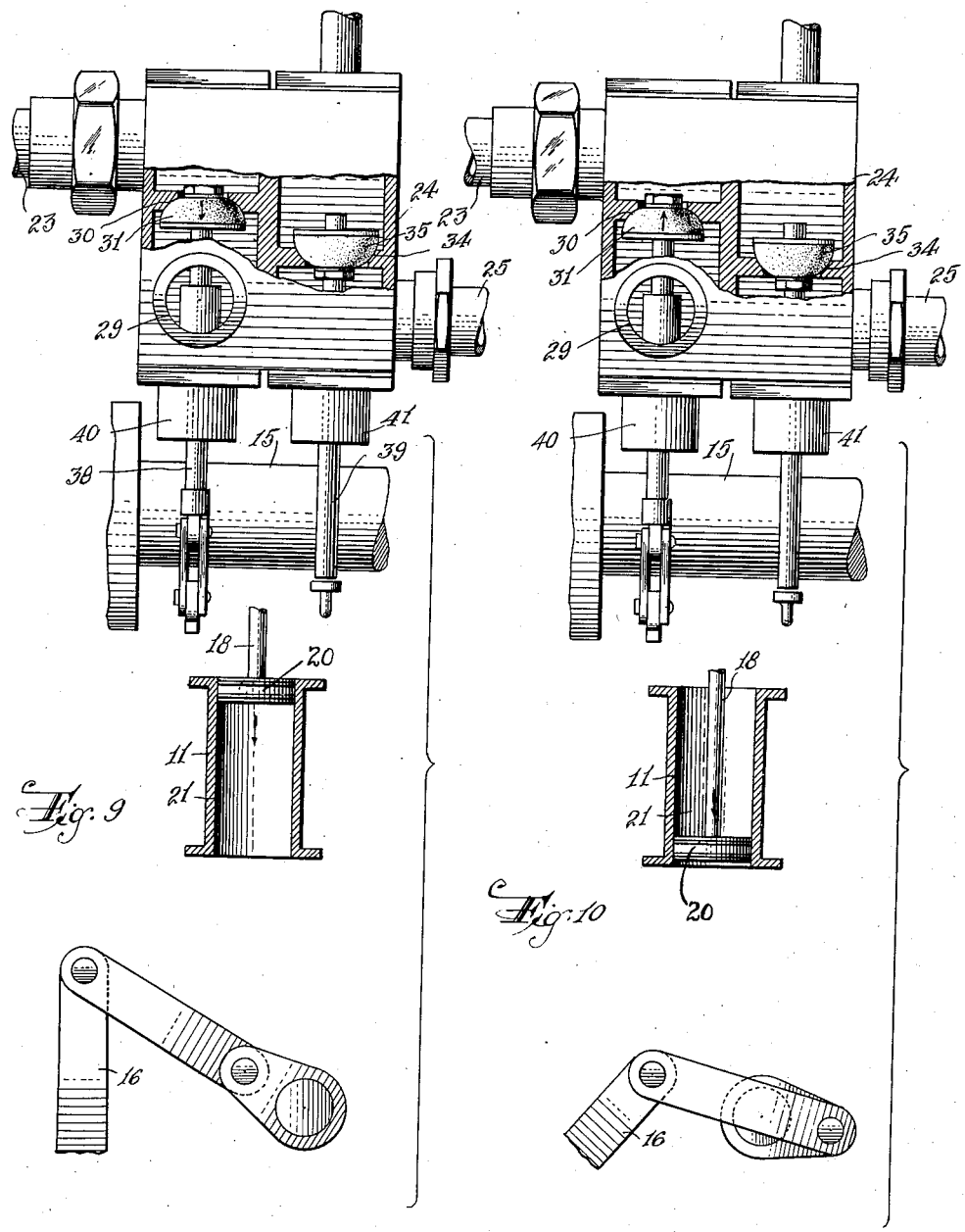

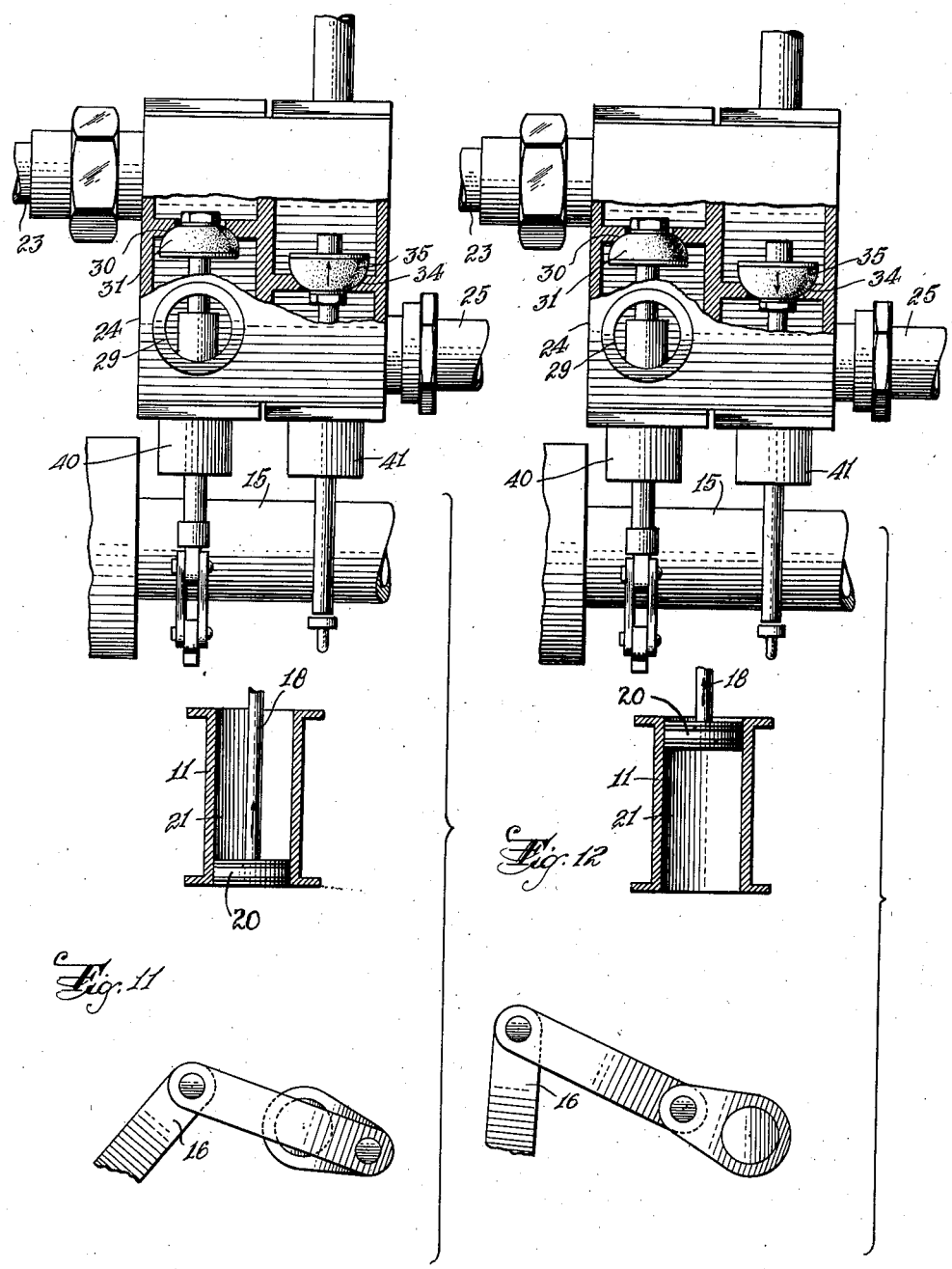

Patented July 1, 1941

2,247,911

UNITED STATES PATENT OFFICE 2,247,911

HIGH PRESSURE WATER CLOSET

Edmund Du Pont, Bloomfield, N. J., assignor, by mesne assignments, to Wilcox, Crittenden & Co., Inc., Middletown, Conn., a corporation of Connecticut Application August 3, 1940, Serial No. 350,293

6 Claims. (Cl. 4—77)

The present invention relates generally to water closets, and more particularly to water closets which are required to be operated against high outlet or discharge pressures.

Of a number of possible applications, the most apparent ones are those for submarines and subterranean closets, such as are encountered in subway stations.

The particular embodiment of the invention described below, has been developed for conditions peculiar to submarine use, although, as already mentioned, the field of application is broader.

In common with such other applications, the operation of a water closet on board a submarine has to contend with high pressures in the outlet conduit, and at a depth of 300 feet below sea level, which is commonly reached by modern submarines, said pressure attains a value of 130 pounds per square inch.

Under such conditions the expulsion of the contents of the closet into the water goes beyond the ordinary flushing arrangement and requires a source of power sufficiently strong to overcome such outside pressure.

In the past, electric pump closets have been in use on surface craft providing for an electric motor driven pump which would draw water into the bowl of the closet, effect a flushing, and finally expel the contents into the sea. In the case of submarines, the power plant necessary to overcome efficiently the outside water pressure was considered too heavy for the special application, and the custom was to simply admit outside water into the closet by means of some form of sea cock and then to expel it therefrom by admitting air under pressure from the compressed air tank of the submarine, also by means of some form of cock. This mode of operation, of course, while effective, at once raises the objection in wartime of causing the submarine to be made known to a surface observer by tell-tale air bubbles unavoidably present.

In emergency dives air expulsion is usually dispensed with in favor of manual pump operation, which, however, is extremely laborious and slow, the working of a long pump lever being necessary over a relatively long period of time to completely expel the contents of the closet after flushing it by the admission of sea water.

The obvious disadvantages of this method raised the demand for an automatically operated closet, the operation of which would not betray the presence of the submarine to an enemy surface craft.

It is accordingly an object of this invention to provide an automatically operable pump closet for submarines and other applications where considerable outlet pressure has to be overcome.

In order to be able to employ an economical power plant, the installation in accordance with the invention provides for an arrangement which utilizes a pressure equalizing contrivance in connection with the working piston of the pump.

It is, therefore, another object of the invention to provide a pump type water closet installation for the purpose stated, which utilizes the pressure of the water opposing the exhaustion of the closet to aid said exhaust operation.

In water closets for marine use as previously constructed it is possible for the closet flushing valve to be open at the same time as the sea inlet valve, so that flooding of the closet is likely. Were such a water closet construction employed for submarine use, it would be possible to flood the submarine by accidentally leaving the sea inlet valve open.

It is accordingly a still further object of the invention to provide an interlocked valve arrangement in which it is impossible to have the closet flushing valve open at the same time as the sea inlet valve.

It is a further object to provide a closet installation of the type referred to which is flushed automatically by the pump that accomplishes its evacuation.

These and other objects of the invention will become apparent from the following detailed description of the invention and the accompanying drawings, wherein:

Figures 3, 4, 5 and 6 are respectively the front, side and rear elevations and the plan view of the closet aggregate.

Figure 7 is a detail of Figure 5 with the pressure equalizing and flushing control shown in partial section.

Figures 9, 10, 11 and 12 are schematic showings of the operative relation between the pump piston and the inlet and flush valves.

Figure 1:
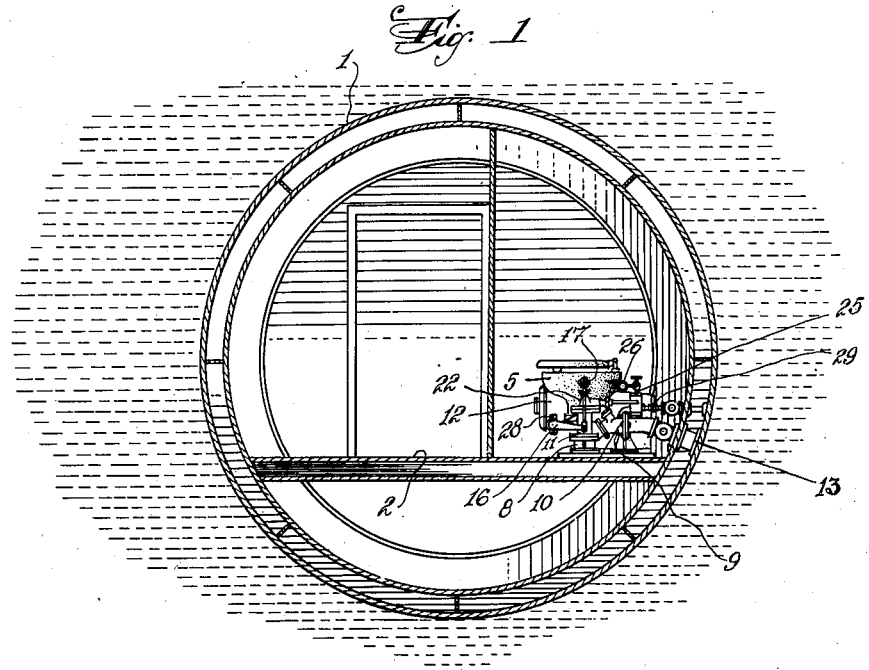
Figure 1 represents a diagrammatic crosswise section through a submarine allowing a side view of the closet.
Figure 2:
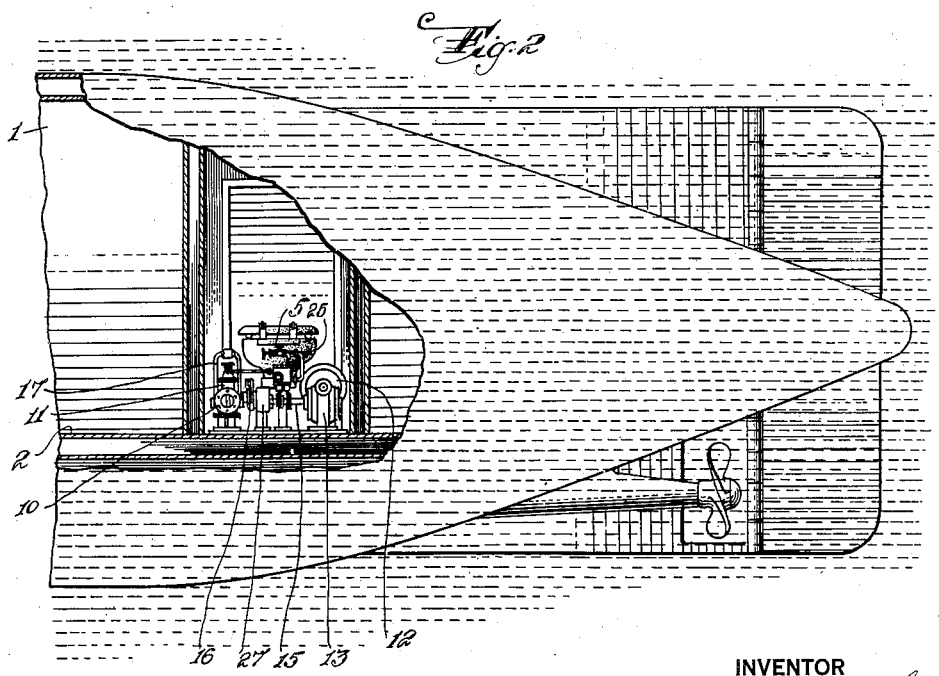
Figure 2 is a similar and lengthwise section showing the closet assembly from its rear.
Figure 8:
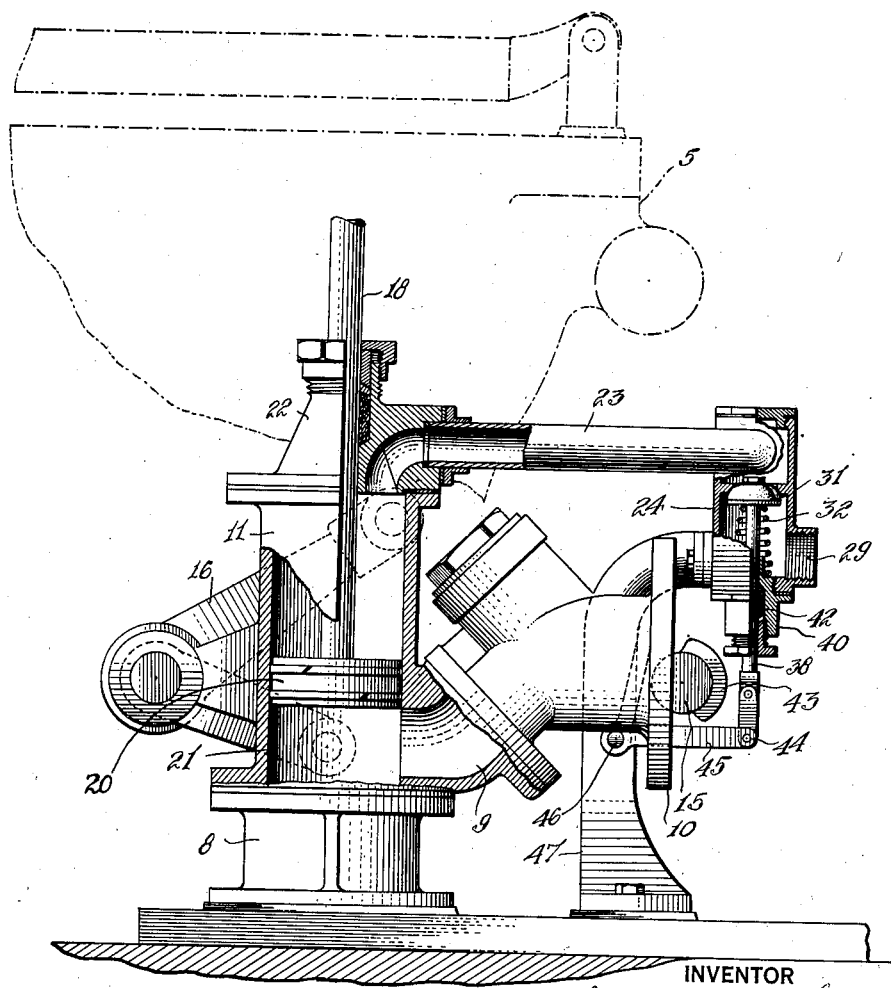
Figure 8 is a detail of Figure 4 showing the pressure equalizing control.

Referring now to the drawings, reference numeral 1 represents the hull of a submarine and 2 the main deck thereof, the water closet of the present invention being shown in side elevation.

as more particularly detailed in Figure 4. In Figure 2, showing a lengthwise section of the submarine, the closet is shown in rear elevation, as more particularly detailed in Figure 5.

In Figures 3 through 8, which show the general assembly in various views, 5 refers to a toilet bowl suitably secured to a support at 6 and emptying through a waste pipe 7 into a waste receptacle 8. The waste receptacle 8 communicates with an outlet 13 (Figure 1) in the hull of the submarine through an outlet pipe 9, which is illustrated only up to a suitable connecting flange 10. The waste receptacle 8 is operatively connected to a pump 11, which is operated by an electric-motor 12 through the medium of reduction gearing 14, a drive shaft 15, and a crank and connecting rod assembly 16, which causes the reciprocation of a yoke element 17. A piston rod 18 is secured at one end to yoke 17 at 19, and at its other end carries a pump piston 20 (Figure 8), which because of said yoke connection reciprocates in the pump cylinder 21. The lower end of the cylinder 21 communicates with the waste receptacle 8, while its upper end through the cylinder head 22 and the conduit 23 connects with a valve chamber 24, the details of which are shown in Figure 7. The valve chamber 24, through a rinsing pipe 25, communicates with the toilet bowl 5 by means of the bowl inlet fitting 26. The rinsing arrangement in the bowl is of the familiar tubular type with circumferentially spaced openings and is not illustrated, as it has no direct bearing on the present invention. Reference numeral 27 indicates a supporting bearing for the drive shaft 15, and 28 refers to the bearings for the yoke actuating crank 16. The intake connection leading from the sea through the hull of the submarine into the valve chamber 24, is shown at 29.

The valve chamber 24, as shown in detail in Figure 7, is provided with an inlet chamber having a passage 30 and an inlet valve 31 controlling communication through the passage 30 between the sea intake 29 and the conduit 23, which in turn communicates with the upper side of the piston 20 in the cylinder 21. The inlet valve is maintained normally closed by a spring 32. A flush valve 35, which is maintained normally closed by a spring 36, controls the flow of the flushing and rinsing stream from the upper portion of the valve chamber 24 through the passage 34, the flushing and rinsing pipe 25 and the bowl inlet fitting 26 to the bowl 5. Each of the valves 31 and 35 has a valve stem 38 and 39 respectively, extending through bushings 40 and 41 and packing 42 adjacent the drive shaft 15, which carries an actuating cam for each valve stem, of which one is shown in profile at 43 in Figure 8, in which the valve stem 38 is shown pivotally connected at 44 to a bell crank lever 45 rotatably secured at 46 to a supporting means 47. The relationship between the cam 43 and the lever 45 is such that as the shaft 15 rotates and the cam 43 makes contact with lever 45, the lever is depressed causing an unseating of the inlet valve 31 against the force of spring 32 and the pressure of the outside sea water in the sea intake 29. A corresponding lever and cam arrangement is provided for the flush valve 35 and its stem 39, except that here the cam causes the respective lever and the valve stem 39 to be lifted so as to unseat the flush valve 35 against the force of its seating spring 36. The details of the last named cam and lever are not shown as they, as well as the inlet valve cam-lever mechanism, may assume any one of a number of possible forms.

The relationship between the drive shaft 15, which causes the reciprocation of the piston 20, the cams thereon and inlet and flush valves 31 and 35 is synchronized to effect an opening of the inlet valve and a closing of the flush valve as the piston travels downwardly, and to reverse this order as the piston is on its upstroke.

The various phases of operation are shown in Figures 9, 10, 11 and 12, which are practically self-explanatory; Figure 9 showing the piston in the cylinder 11 at the start of its downward stroke and the inlet 31 about to open; Figure 10 showing the piston near the end of its downward stroke and the inlet valve as having just closed; Figure 11 showing the piston at the start of its upward stroke and the flush valve 35 about to open; and Figure 12 showing the piston near the end of its upward stroke and the flush valve as having just closed.

The piston 20 is double acting, effecting both a suction and a pumping action with respect to both ends of its cylinder. Suitable check valves between the lower cylinder end and the waste receptacle 8, and between the bowl and the outlet 13 to the sea, which for example may be as shown in Figure 4 of Letters Patent of the United States No. 1,888,842, permit the piston during its upstroke to exert a suction on the toilet bowl 5, the waste pipe 7 and the waste receptacle 8, and a pumping action on the waste receptacle 8 and the outlet 9 on its down stroke.

With respect to the upper end of the pump cylinder, a suction is established on the downstroke of the piston in the suction conduit 23, sea water being admitted through the inlet valve passage 30, which is then open. On its upstroke, the piston 20 pumps the water present in the pipe 23 and above valve 31, which is now closed, through the flush valve passage 34 past the open flush valve 35 through the flush pipe 25 into the bowl 5 to effect a rinsing or flushing action therein. This sequence of operations is repeated as long as the motor 12 is in action.

At 48 is shown a control means for the electric motor 12 which may be of any suitable construction, as for example, a push-button type electric control switch, which may be operated at will.

By reason of the provision of the cams 43 on the drive shaft 15 for sequentially and positively controlling the opening of the inlet valve 31 and the flush valve 35 against the action of the springs 32 and 36, it is impossible for the flush valve to be open while the inlet valve is open, and so the possibility of flooding the closet or the submarine is avoided.

Furthermore, because of the fact that sea water is admitted on the top of the piston 20 during its downward waste expelling stroke, the pressures on the upper and lower surfaces are equal, and the power plant required to operate the pump is not nearly as large as would be required were such equalizing arrangement not employed.

Although I have shown and described a specific embodiment of my invention, I am fully aware that modifications thereof are possible, and it is to be understood that the present invention, while it has been described with specific reference to the accompanying drawings, is not to be limited save as defined in the appended claims.

I claim as my invention:

1. The combination with a pump cylinder communicating at one end with the lower chamber of a water closet and with a discharge conduit, of a water supply conduit communicating with the other end of the cylinder, an inlet valve controlling fluid flow from the supply conduit to the cylinder, a flushing water conduit between the last named end of the cylinder and the closet bowl, a flush valve between the cylinder and the flushing water conduit controlling fluid flow from the cylinder to the flushing water conduit, a piston in the cylinder, power means to actuate the piston, said inlet and flush valves being normally yieldingly closed, and means associated with the power means to positively and sequentially open and close said inlet and flush valves, whereby said piston effects both suction and pumping actions with respect to both sides thereof and said flush valve is positively closed whenever said inlet valve is open.

2. The combination with a pump cylinder communicating at one end with the lower chamber of a water closet and with a discharge conduit, of a water supply conduit communicating with the other end of the cylinder, an inlet valve controlling fluid flow from the supply conduit to the cylinder, a flushing water conduit between the last named end of the cylinder and the closet bowl, a flush valve between the cylinder and the flushing water conduit controlling fluid flow from the cylinder to the flushing water conduit, a piston in the cylinder, power means to actuate the piston, said inlet and flush valves being so arranged with respect to the fluid controlled that they open against the pressure of the controlled fluid, and means associated with the power means to positively and sequentially open and close said inlet and flush valves.

3. The combination with a pump cylinder communicating at one end with the lower chamber of a water closet and with a discharge conduit, of a water supply conduit communicating with the other end of the cylinder, an inlet valve controlling fluid flow from the supply conduit to the cylinder, a flushing water conduit between the last named end of the cylinder and the closet bowl, a flush valve between the cylinder and the flushing water conduit controlling fluid flow from the cylinder to the flushing water conduit, a piston in the cylinder, power means to actuate the piston, compression springs normally yieldingly closing said inlet and flush valves arranged to act with the pressure of the controlled fluid, and means associated with the power means to positively and sequentially open and close said inlet and flush valves.

4. The combination with a pump cylinder communicating at one end with the lower chamber of a water closet and with a discharge conduit, of a water supply conduit communicating with the other end of the cylinder, an inlet valve controlling fluid flow from the supply conduit to the cylinder, a flushing water conduit between the last named end of the cylinder and the closet bowl, a flush valve between the cylinder and the flushing water conduit controlling fluid flow from the cylinder to the flushing water conduit, a piston in the cylinder, power means to actuate the piston, said inlet and flush valves being normally yieldingly closed and said power means including power transmitting means, a valve stem for each of the inlet and flush valves arranged to extend adjacent the power transmitting means, and means associated with the power transmitting means adapted to alternately engage and disengage the respective valve stems and to thereby positively and sequentially open and close said inlet and flush valves.

5. The combination with a pump cylinder communicating at one end with the lower chamber of a water closet and with a discharge conduit, of a water supply conduit communicating with the other end of the cylinder, an inlet valve controlling fluid flow from the supply conduit to the cylinder, a flushing water conduit between the last named end of the cylinder and the closet bowl, a flush valve between the cylinder and the flushing water conduit controlling fluid flow from the cylinder to the flushing water conduit, a piston in the cylinder, power means to actuate the piston, said inlet and flush valves being normally yieldingly closed and said power means including a power transmitting shaft, a valve stem for each of the inlet and flush valves arranged to extend adjacent the power transmitting shaft, and cams on the power transmitting shaft adapted to alternately engage and disengage the respective valve stems.

6. The combination with a pump cylinder communicating at one end with the lower chamber of a water closet and with a discharge conduit, of a water supply conduit communicating with the other end of the cylinder, an inlet valve controlling fluid flow from the supply conduit to the cylinder, a flushing water conduit between the last named end of the cylinder and the closet bowl, a flush valve between the cylinder and the flushing water conduit controlling fluid flow from the cylinder to the flushing water conduit, a piston in the cylinder, power means to actuate the piston, and means associated with the power means to sequentially open and close said inlet and flush valves, said inlet valve being open during the waste discharging stroke of the piston, whereby the water pressures on both sides of the piston are substantially equal and the power required to actuate the piston is effectively minimized.

EDMUND DU PONT.